(12) United States Patent
Fukui

(10) Patent No.: US 7,420,940 B2
(45) Date of Patent: Sep. 2, 2008

(54) RADIO COMMUNICATION SYSTEM AND RADIO TERMINAL

(75) Inventor: Hiroaki Fukui, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 82 days.

(21) Appl. No.: 10/960,497

(22) Filed: Oct. 8, 2004

(65) Prior Publication Data

US 2005/0107089 A1   May 19, 2005

(30) Foreign Application Priority Data

Oct. 9, 2003   (JP) ............................. 2003-351053

(51) Int. Cl.
*H04Q 7/00* (2006.01)
(52) U.S. Cl. .................. 370/328; 370/338; 455/452.1
(58) Field of Classification Search .............. 455/405, 455/408, 411
See application file for complete search history.

(56) References Cited

U.S. PATENT DOCUMENTS

| | | | |
|---|---|---|---|
| 6,032,038 A * | 2/2000 | Schroderus et al. | 455/405 |
| 6,405,031 B1 * | 6/2002 | Altschul et al. | 455/411 |
| 2002/0058494 A1 * | 5/2002 | Timonen et al. | 455/405 |
| 2003/0114224 A1 * | 6/2003 | Anttila et al. | 463/40 |
| 2004/0002345 A1 * | 1/2004 | Miki | 455/456.1 |
| 2004/0120297 A1 * | 6/2004 | McDonnell et al. | 370/338 |
| 2004/0125781 A1 * | 7/2004 | Walter et al. | 370/338 |
| 2006/0003736 A1 * | 1/2006 | Chan et al. | 455/408 |

FOREIGN PATENT DOCUMENTS

| | | |
|---|---|---|
| JP | 2000-324271 | 11/2000 |
| JP | 2003-258817 | 9/2003 |

OTHER PUBLICATIONS

"Notification of Reasons for Rejection" for Japanese Patent Application 2003-351053, dated Jan. 18, 2008, 2 pages.

* cited by examiner

*Primary Examiner*—Vincent P. Harper
*Assistant Examiner*—Mazda Sabouri
(74) *Attorney, Agent, or Firm*—Finnegan, Henderson, Farabow, Garrett & Dunner, L.L.P.

(57) ABSTRACT

An access-point announces change of a password to a client every time a predetermined time passes. The client displays the password notified by the access-point, and a user seeing the password sets the password and continues communication. The access-point decrypts the received packet data with the announced password.

3 Claims, 11 Drawing Sheets

PASSWORD IS CHANGED IN "5" MINUTES.
COMMUNICATION LINK IS DISCONNECTED UNLESS
PASSWORD IS CHANGED.

CHANGE PASSWORD TO NEW "2WORD".

| Times | Passwords |
|---|---|
| 9 : 30 | WORD A |
| 9 : 45 | WORD 1 |
| 10 : 00 | WORD 3 |
| 10 : 15 | WORD 4 |
| 10 : 30 | WORD 5 |
| 10 : 45 | WORD 6 |
| 11 : 00 | WORD 7 |
| 11 : 15 | WORD 8 |
| ⋮ | ⋮ |
| ⋮ | ⋮ |

| Times | Passwords |
|---|---|
| 9 : 30 | LANP A |
| 9 : 45 | LANP W |
| 10 : 00 | LANP 2 |
| 10 : 15 | LANP 3 |
| 10 : 30 | LANP 4 |
| 10 : 45 | LANP 5 |
| 11 : 00 | LANP 6 |
| 11 : 15 | LANP 7 |
| ⋮ | ⋮ |
| ⋮ | ⋮ |

RADIO COMMUNICATION SYSTEM AND RADIO TERMINAL

CROSS-REFERENCE TO RELATED APPLICATIONS

This application is based upon and claims the benefit of priority from prior Japanese Patent Application No. 2003-351053, filed Oct. 9, 2003, the entire contents of which are incorporated herein by reference.

BACKGROUND OF THE INVENTION

1. Field of the Invention

This invention relates to radio communication systems such as mobile communication systems, for example, wireless LAN, a mobile telephone, etc.

2. Description of the Related Art

Recently, a wireless LAN network has been constructed and a hot-spot service providing the internet connection service has become popular. The "hot-spot" implies a radio communication area in which the service can be obtained. This service is often provided in, for example, cafes and restaurants to attract customers.

However, the radio communications area offering the service may extend out of the shops and stores, and persons outside them can obtain the service. For this reason, the communications may be intercepted or unauthorized access to the communications may be made To prevent the unauthorized access, encryption has been executed in the steps of WEP (Wired Equivalent Privacy), i.e. the wireless LAN standard based on IEEE 802.11. According to this method, however, there is a problem that the unauthorized access can be made for a long time by decrypting an encryption key.

BRIEF SUMMARY OF THE INVENTION

The present invention has been accomplished to solve the above-described problems. The object of the present invention is to provide a radio communication system and a radio terminal capable of preventing a long-time unauthorized access to the communications.

According to an aspect of the present invention, there is provided a radio communication system capable of executing radio communication with a radio terminal and allowing the radio terminal to be connected to a network. The system comprises radio communication means for executing the radio communication with the radio terminal, connection time measuring means for measuring a radio communication time with the radio terminal using the radio communication means, and communication control means for controlling the radio communication means to terminate the radio connection with the radio terminal if the time measured by the connection time measuring means has passed a preset time.

According to the present invention, as stated above, the time of radio communication with the radio terminal is measured. If the radio communication time has passed a preset time, the radio connection with the radio terminal is terminated.

Since the radio connection with the radio terminal is terminated in accordance with the radio communication time with the radio terminal, a long-time unauthorized access can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows an example of information displayed on a display unit shown in FIG. 1;

DETAILED DESCRIPTION OF THE INVENTION

Embodiments of the present invention will be explained below with reference to the accompanying drawings.

Figure 1:
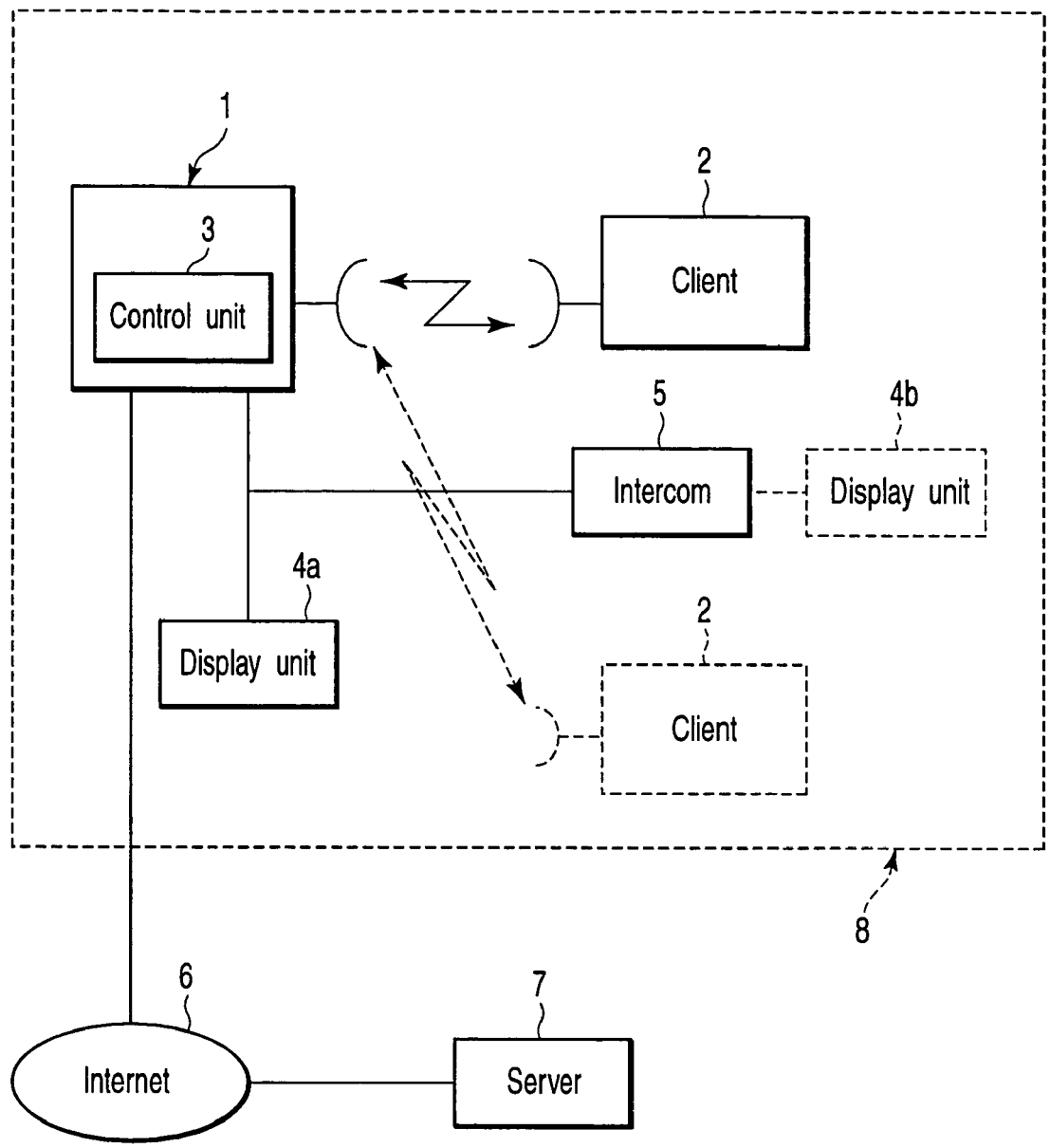
FIG. 1 shows a wireless LAN system according to an embodiment of the present invention.

FIG. 1 shows a wireless LAN system according to a first embodiment of the present invention. The wireless LAN system shown in the figure is constructed in, for example, a cafe, a restaurant or a specific area, and includes an access-point 1, a client 2, a control unit 3, a display unit 4a, a display unit 4b, and a server 7.

The access-point 1 is controlled by the control unit 3 to carry out radio communication with the client 2. A hot-spot 8 is formed as an area in which radio communication with the client 2 can be made. In addition, the access-point 1 executes communication with the server 7 via Internet 6. Then, the access-point 1 packetizes the data and executes relay communication between the client 2 and the server 7.

The client 2 is a radio terminal having the wireless LAN function, such as a personal computer, a PDA (personal digital assistant) and the like that the user of the hot-spot service uses, and executes radio communication with the access-point 1 inside the hot-spot 8. FIG. 1 shows one client 2.

However, a plurality of clients 2 can simultaneously execute radio connection with the access-point 1.

The display unit 4a and the display unit 4b are provided inside the hot-spot 8. The display unit 4a is a large display device, which is installed at a position which cannot be seen from the outside of the shop or store offering the hot-spot service. The display unit 4a is directly connected to the control unit 3, executes communication with the control unit 3, and shows various information to the user.

An intercom 5 executes communication with the control unit 3 to allow various kinds of received information to be displayed on the display unit 4b. The display unit 4b is a small display device installed on a table or the like that the user uses.

The control unit 3 has a control function of controlling radio communication means which the access-point 1 comprises, and conducting radio communication with the client 2. The control function controls radio connection with the client 2 by conducting authentication in accordance with protocol based on IEEE 802.11 and measuring the radio communication time.

Figure 2:
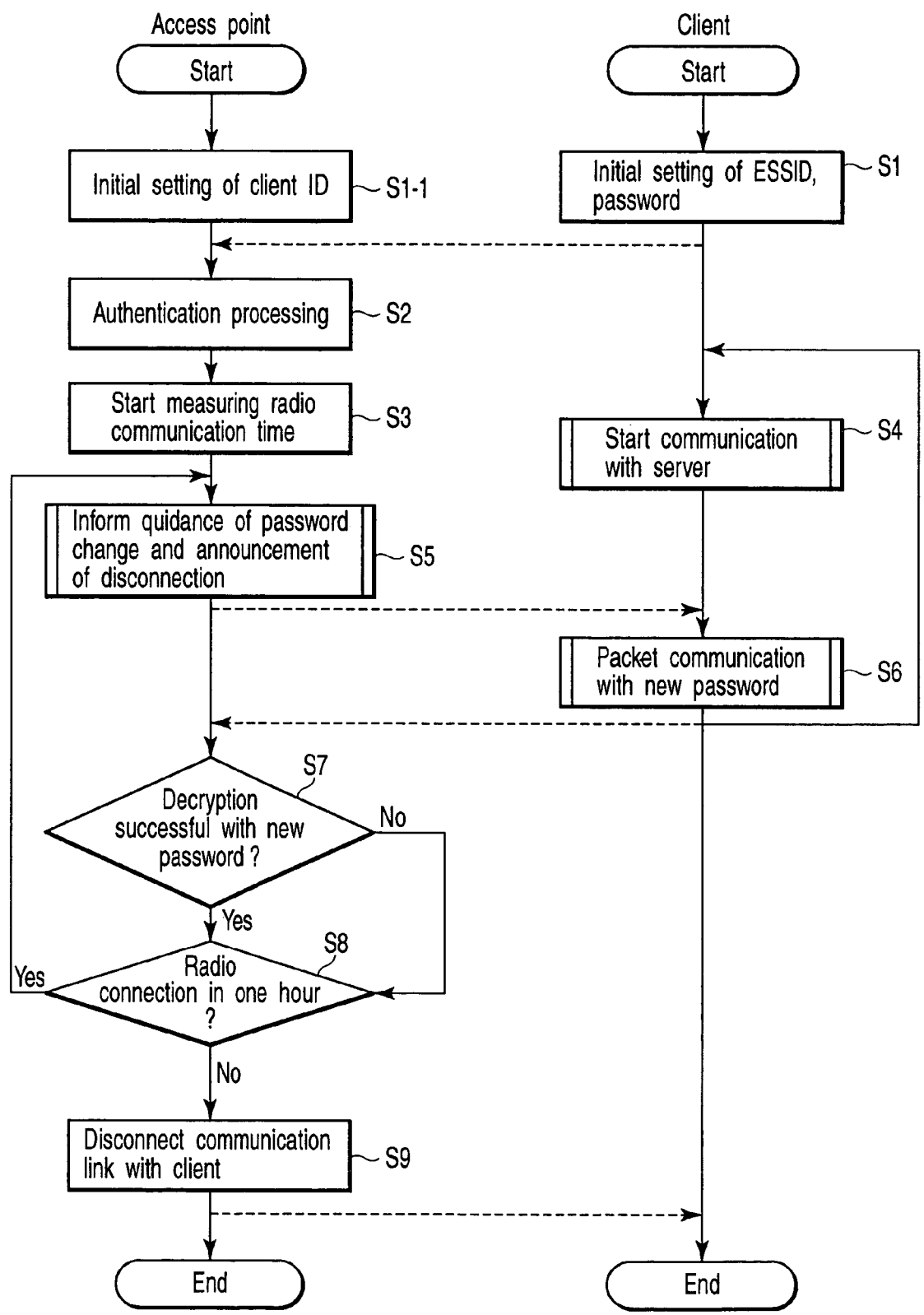
FIG. 2 shows a flowchart of operations of the wireless LAN system according to the first embodiment.

Next, operations of the wireless LAN system having the above-described configuration will be explained. FIG. 2 shows a flowchart of the operations to explain the processing of the access-point 1 and that of the client 2. The software for the processing executed by the access-point 1 is stored in a memory unit of the control unit 3. The program for the processing executed by the client 2 is stored in a memory unit inside the client 2.

The processings shown in FIG. 2 are based on the WEP, using no high-level encryption software. The processings prevent unauthorized access by regularly changing a password which is required when the client 2 establishes radio communication with the access-point 1.

The access-point 1 prestores an initial password and an ESSID (enhanced service set identifier) assigned to the client 2 as initial setting data (step s1-1). In the following explanation, for example, one hour is set in the access-point 1 as the service limit time.

If the user operates the client 2 and inputs a command to start up the wireless LAN communication, the client 2 starts up the wireless LAN driver software built therein. The client 2 is operated by the software to request the user to input the initial password of WEP "PWORD" and ESSID "HSPOT". The user is preliminarily notified of the initial password and the ESSID by a service provider, at the purchase of the service.

When the initial password and the ESSID are input through a keyboard or the like, the client 2 stores these information items, and controls the radio communication means of the client 2 in the steps of WEP on the basis of the stored information items to attempt radio connection to the access-point 1 (step s1).

The client 2 thereby transmits a radio signal and requests the access-point 1 to connect to the client 2. The radio signal is packetized and the ESSID is included in header information of the radio signal.

When the access-point 1 receives the radio signal, the control unit 3 executes decryption processing of the encrypted packet data in predetermined steps of WEP (step s2). In the decryption processing, the control unit 3 attempts decryption of the packet data transmitted from the client 2 with the initial password.

If the control unit 3 succeeds in decrypting the packet data, the control unit 3 recognizes the client 2 as an authorized user, reads the ESSID out of the header information of the packet data and stores the ESSID.

The control unit 3 permits the client 2 to log on to the wireless LAN system, establishes a communication link with the client 2, and starts measuring the radio communication time (step s3).

When the communication link is established in this procedure, the client 2 starts up the WEB browser software and executes communication with the server 7 connected to Internet 6 via the communication link and the access-point 1.

Thus, the client 2 downloads plug-in software P from the server 7 and executes the downloaded plug-in software P (step s4). The client 2 can therefore download various kinds of data and application software from the server 7.

On the other hand, the access-point 1 monitors a measurement result of the radio communication time started in step s3 by the control unit 3. Every time a predetermined time (for example, 15 minutes) has passed, the access-point 1 sends display data to display the contents shown in FIG. 3 to the display unit 4a and the intercom 5 (step s5).

The display data notifies a new password and announces that the radio communication will be ended unless the communication is executed by changing the current password to a new password. It is preferable that this announcement should attract the user by blinking the displayed contents, emitting sounds such as chimes synchronously with the displayed contents, or generating vibration by a vibrator.

When this announcement has been ended, the control unit 3 sets a remaining time to change the current password to the new password at, for example, five minutes and starts countdown of the remaining time. During the remaining time, the control unit 3 executes the processing of attempting decryption of the packet data received from the client 2, with the current password and the new password.

The client 2 accepts the input of the new password from the user. The accepted password is set in the driver software. After that, the client 2 executes transmission and reception of the packet data encrypted with the new password with the client 2 (step s6).

The control unit 3 discriminates whether the packet data received from the client 2 could be decrypted with a new password (step s7). If the packet data could be decrypted, the control unit 3 executes transmission and reception of the packet data encrypted with the new password, even in the remaining time.

In a case where the remaining time has passed, the control unit 3 executes transmission and reception of the packet data encrypted with the new password.

Therefore, even if an unauthorized user steals the password and logs on to the wireless LAN system, he cannot make unauthorized use after a predetermined time has passed since the control unit 3 changes the password every time the predetermined time passes. The password is updated in the above description, but the ESSID may be updated instead.

After that, the control unit 3 discriminates whether the radio communication time measured in step s3 has passed one hour (step s8). If the radio communication time has not passed one hour, the control unit 3 shifts to step s5 and continues the processing. If the radio communication time has passed one hour, the control unit 3 disconnects the communication link with the client 2 (step s9).

Thus, the radio communication time is monitored, and the communication link is disconnected when a predetermined time has passed. Therefore offering the service can be managed exactly and the unauthorized user's long-time use can be prevented.

Next, a wireless LAN system according to a second embodiment of the present invention will be explained. The wireless LAN system is apparently the same as that shown in FIG. 1.

Figure 4:
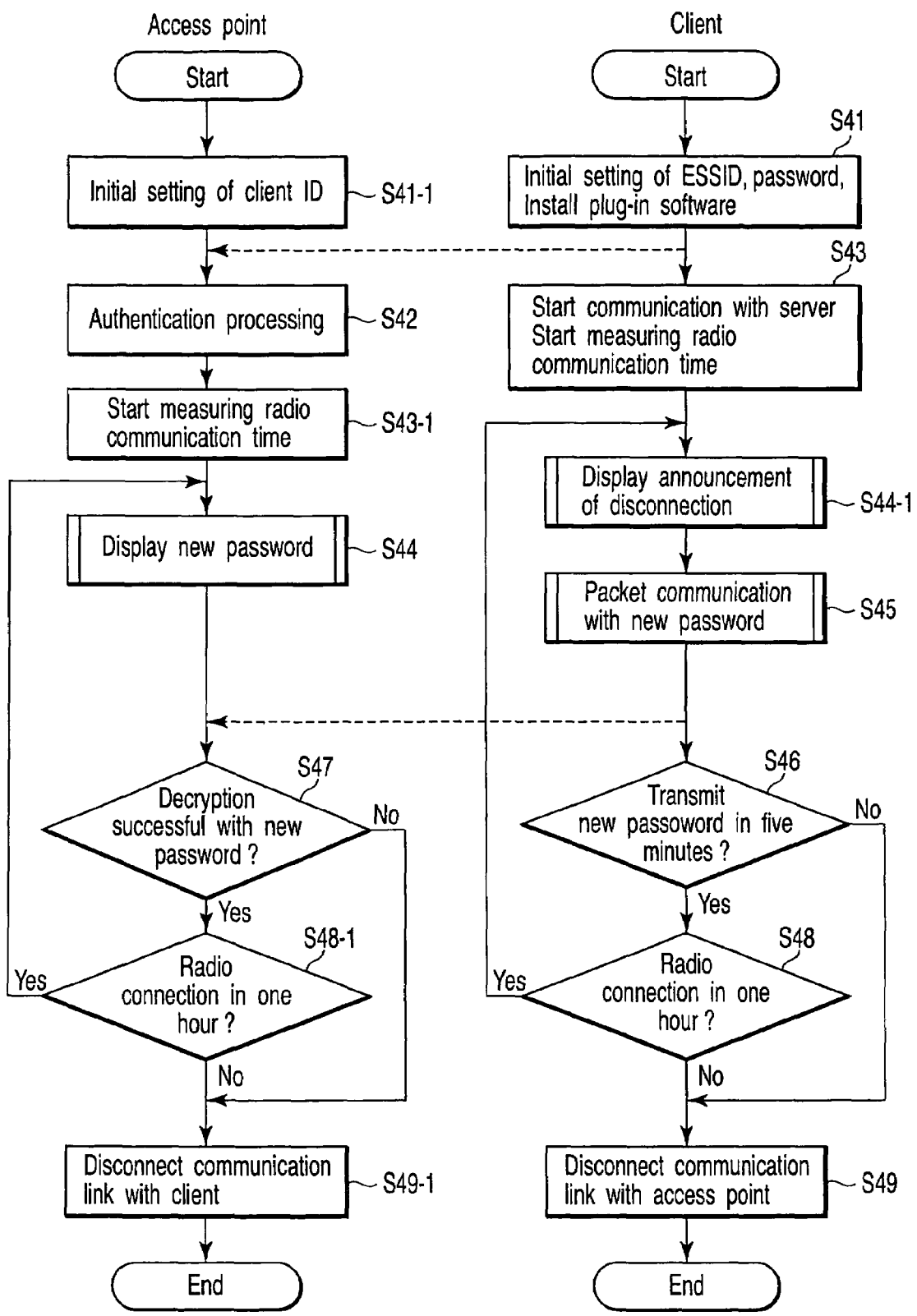
FIG. 4 shows a flowchart of operations of the wireless LAN system according to a second embodiment of the present invention.

FIG. 4 shows a flowchart of operations of the wireless LAN system.

The flowchart indicates the processing of the access-point 1 and that of the client 2. The software for the processing executed by the access-point 1 is stored in a memory unit of the control unit 3.

Plug-in software P of the processing executed by the client 2 is small-scale software and is lent only to the client 2 of the service user by an administrator of the hot-spot service.

The plug-in software P is preinstalled in the client 2. Otherwise, the software may be first stored in the memory unit of the control unit 3, and may be provided to the client 2 by the control unit 3 when the client 2 connects to the access-point 1.

The plug-in software P is operated synchronously with the access-point 1 by referring to an internal clock of the client 2. The software interpolates the control of the wireless LAN with a WEB browser, an e-mail control program and the like installed in the client 2.

The plug-in software P executes the radio communication processing in the steps of WEP. In addition, when log-in is ended, the plug-in software P starts measuring the radio communication connection time by referring to the internal clock, and allows the display unit of the client 2 to display the announcement of disconnection. If predetermined procedures of updating are executed within a determined period, the plug-in software P disconnects the radio communication.

For this reason, the plug-in software P has the following functions:
(1) WEP steps and setting the password in cooperation with the wireless LAN driver;
(2) allowing the announcement of disconnection of the communication to be displayed;
(3) measuring the radio communication time;
(4) disconnecting the communication link with the access-point 1; and
(5) storing the hot-spot service time.

The wireless LAN system according to the second embodiment will be explained below with reference to FIG. 4.

The access-point 1 prestores an initial password and an ESSID assigned to the client 2 as initial setting data (step s41-1). In the following explanation, for example, one hour is set in the access-point 1 as the service limit time.

If the user operates the client 2 and inputs a command to start up the wireless LAN communication, the client 2 starts up the wireless LAN driver software built therein. The client 2 is operated by the software to request the user to input the initial password of WEP "PWORD", and "HSPOT" as the ESSID.

The user is preliminarily notified of the initial password and the ESSID, by a service provider, at the purchase of the service. The plug-in software P is preinstalled in the client 2.

When the initial password and the ESSID are input through a keyboard or the like, the client 2 stores these information items, and controls the radio communication means of the client 2 in the steps of WEP on the basis of the stored information items to attempt radio connection to the access-point 1 (step s41).

The client 2 thereby transmits a radio signal and requests the access-point 1 to connect to the client 2. The radio signal is packetized and the ESSID is included in header information of the radio signal.

When the access-point 1 receives the radio signal, the control unit 3 executes the decryption processing of the encrypted packet data in predetermined steps of WEP (step s42). In the decryption processing, the control unit 3 attempts decryption of the packet data transmitted from the client 2 with the initial password.

If the control unit 3 succeeds in decrypting the packet data, the control unit 3 recognizes the client 2 as an authorized user, reads the ESSID out of the header information of the packet data and stores the ESSID. The access-point 1 does not notify the client 2 of termination of the authentication or the like. If the control unit 3 fails the authentication processing, the user resets a correct password.

The control unit 3 permits the client 2 to log on to the wireless LAN system, establishes a communication link with the client 2, and starts measuring the radio communication time (step s43-1).

When the communication link is established in this procedure, the client 2 starts up the WEB browser software and executes communication with the server 7 connected to Internet 6 via the communication link and the access-point 1. The client 2 can therefore download various kinds of data and application software from the server 7.

The client 2 starts up the plug-in software P. The client 2-starts measuring the radio communication time with the plug-in software P thus started (step s43).

The client 2 monitors a measurement result of the radio communication time started in step s43 with the plug-in software P. Every time a predetermined time (for example, 15 minutes) has passed, the client 2 discriminates that the time five minutes before the password changing time has come.

Figure 5:
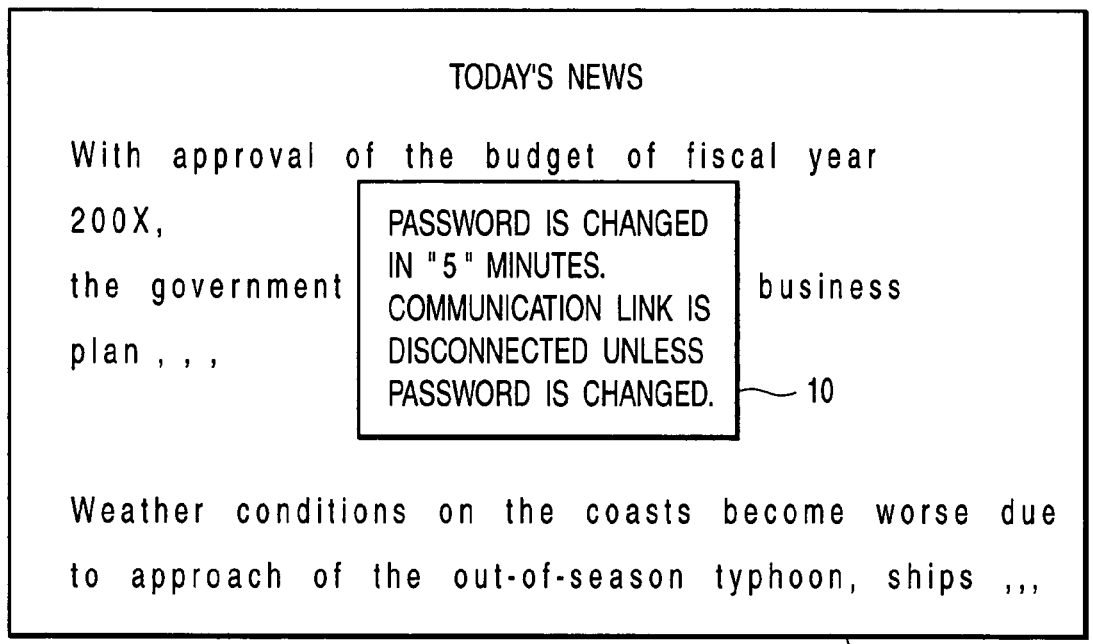
FIG. 5 shows an example of information displayed on a display unit of a client shown in FIG. 1.

At the time five minutes before the password changing time, an announcement display 10 is shown on the display unit 2a of the client 2 as a pop-up display as shown in FIG. 5, and countdown of the remaining time to the password changing time is started (step s44-1). The announcement display 10 indicates that the radio communication link with the access-point 1 will be disconnected if the password is not changed during the remaining time of five minutes.

On the other hand, the access-point 1 monitors a measurement result of the radio communication time started in step s43-1 by the control unit 3. Every time a predetermined time (for example, 15 minutes) has passed, the access-point 1 sends display data to display the contents shown in FIG. 6 to the display unit 4a and the intercom 5 (step s44).

The display data announces a new password, but does not include the password. It is preferable that this announcement should attract the user by blinking the displayed contents, emitting sounds such as chimes on the display, or generating vibration by a vibrator.

When this announcement has been ended, the control unit 3 sets a remaining time to change the current password to the new password at, for example, five minutes and starts countdown of the remaining time. During the remaining time, the control unit 3 executes the processing of attempting decryption of the packet data received from the client 2, with the current password and the new password.

The client 2 makes the display unit 2a execute displaying to urge the user to input the new password, by the plug-in software P that is being executed, and accepts the input of the new password from the user.

The accepted password is set in the driver software. After that, the client 2 executes transmission and reception of the packet data encrypted with the new password with the client 2 (step s45).

In addition, the client 2 monitors the time to pass until the password is input, with the plug-in software P (step s46). If the password is input within five minutes, the client 2 shifts to step s48. If the password is not input within five minutes, the client 2 shifts to step s49.

In step s48, the client 2 discriminates whether the radio communication time measured in step s43 has passed one hour, with the plug-in software P. If the radio communication time has not passed one hour, the client 2 shifts to step s44-1 and continues the processing. If the radio communication time has passed one hour, the client 2 shifts to step s49.

In step s49, the client 2 disconnects the communication link with the access-point 1, with the plug-in software P. In addition, the client 2 uninstalls the plug-in software P.

Thus, the radio communication time is monitored. Every time a predetermined time passes, inputting of the new password is requested. The communication link is disconnected when the predetermined time has passed. Therefore offering the service can be managed exactly and the unauthorized user's long-time use can be prevented.

At the access-point 1, the control unit 3 discriminates whether the packet data received from the client 2 could be decrypted with the new password (step s47). If the packet data could be decrypted, the control unit 3 executes transmission and reception of the packet data encrypted with the new password, even in the remaining time. In a case where the remaining time has passed, the control unit 3 executes transmission and reception of the packet data encrypted with the new password.

Therefore, even if an unauthorized user steals the password and logs on to the wireless LAN system, he cannot make unauthorized use after a predetermined time has passed since the control unit 3 changes the password every time the predetermined time passes.

Since the new password is notified by the display units 4a and 4b, an authorized user existing outside the shop or store offering the hot-spot service cannot acquire the new password. The password is updated in the above description, but the ESSID may be updated instead.

After that, the control unit 3 discriminates whether the radio communication time measured in step s43-1 has passed one hour (step s48-1). If the radio communication time has not passed one hour, the control unit 3 shifts to step s44 and continues the processing. If the radio communication time has passed one hour, the control unit 3 disconnects the communication link with the client 2 (step s49-1).

Thus, the radio communication time is monitored, and the communication link is disconnected when a predetermined time has passed. Therefore offering the service can be managed exactly and the unauthorized user's long-time use can be prevented.

In addition, in a case where the plug-in software P of the client 2 is downloaded from the access-point 1 at the start of connection and executed, the user does not need to prepare the software, and the software has much convenience.

If a password abbreviating/registering function is added, the password can be easily set for the wireless LAN driver. In other words, the access-point 1 and the plug-in software P comprise a common password abbreviation table. The password abbreviation table corresponds to an abbreviated number and a password character string.

In password notification (step s44) using the display units 4a and 4b, the abbreviated number is notified. If the user inputs the abbreviated number, the client 2 detects the password corresponding to the input abbreviated number in the password abbreviation table, in accordance with the plug-in software P, and sets the detected password in the wireless LAN driver.

The access-point 1 attempts reception of the signal encrypted with the password corresponding to the notified abbreviated number. Thus, the user can easily input the password. In addition, even if an unauthorized user steals the abbreviated number, he cannot use the wireless LAN system since the abbreviated number is not the password.

Figures 6, 7:
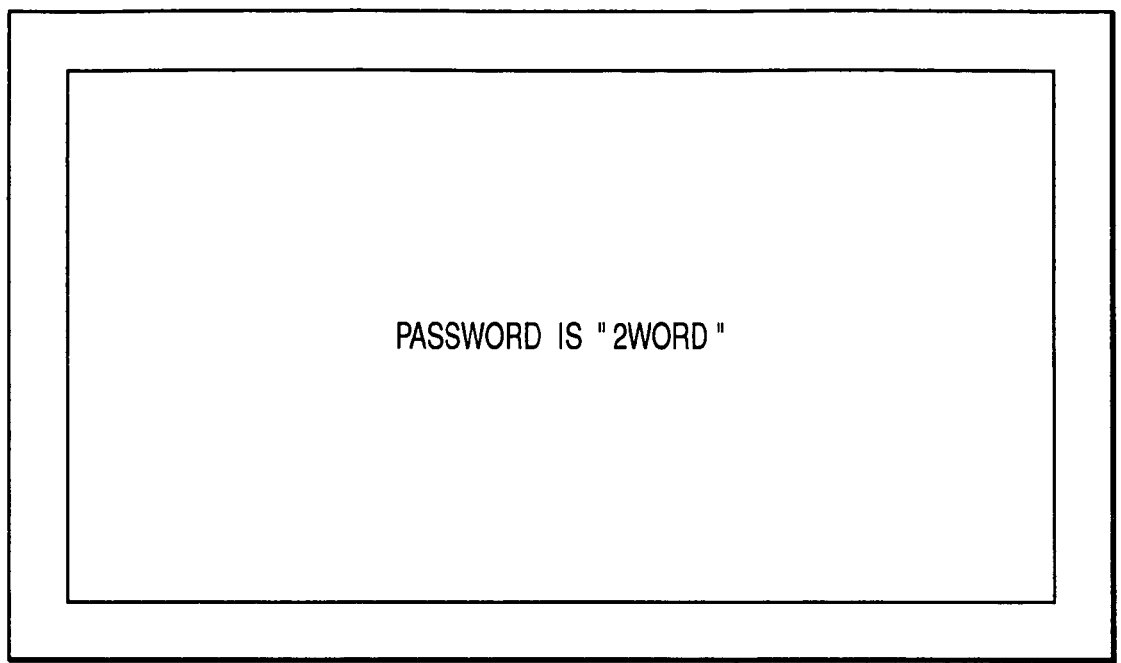
FIG. 6 shows an example of information displayed on a display unit shown in FIG. 1.
FIG. 7 shows a password table stored by an access-point and the client shown in FIG. 1.

In the above descriptions, each of the access-point 1 and the client 2 executes the processing associated with the password change every fifteen minutes after the radio communication is started. Instead, for example, the access-point 1 and the client 2 may measure the radio communication time, store a table in which the time and password correspond to each other as shown in FIG. 7, and automatically change the password in accordance with the time to execute the communication.

In this case, the announcement is not made to the user by the access-point 1 at the time of updating the password, but is made on the client 2 by the plug-in software P. If the user does not input the password within a predetermined time (for example, five minutes), the communication link with the access-point 1 is disconnected by the plug-in software P.

Figure 8:
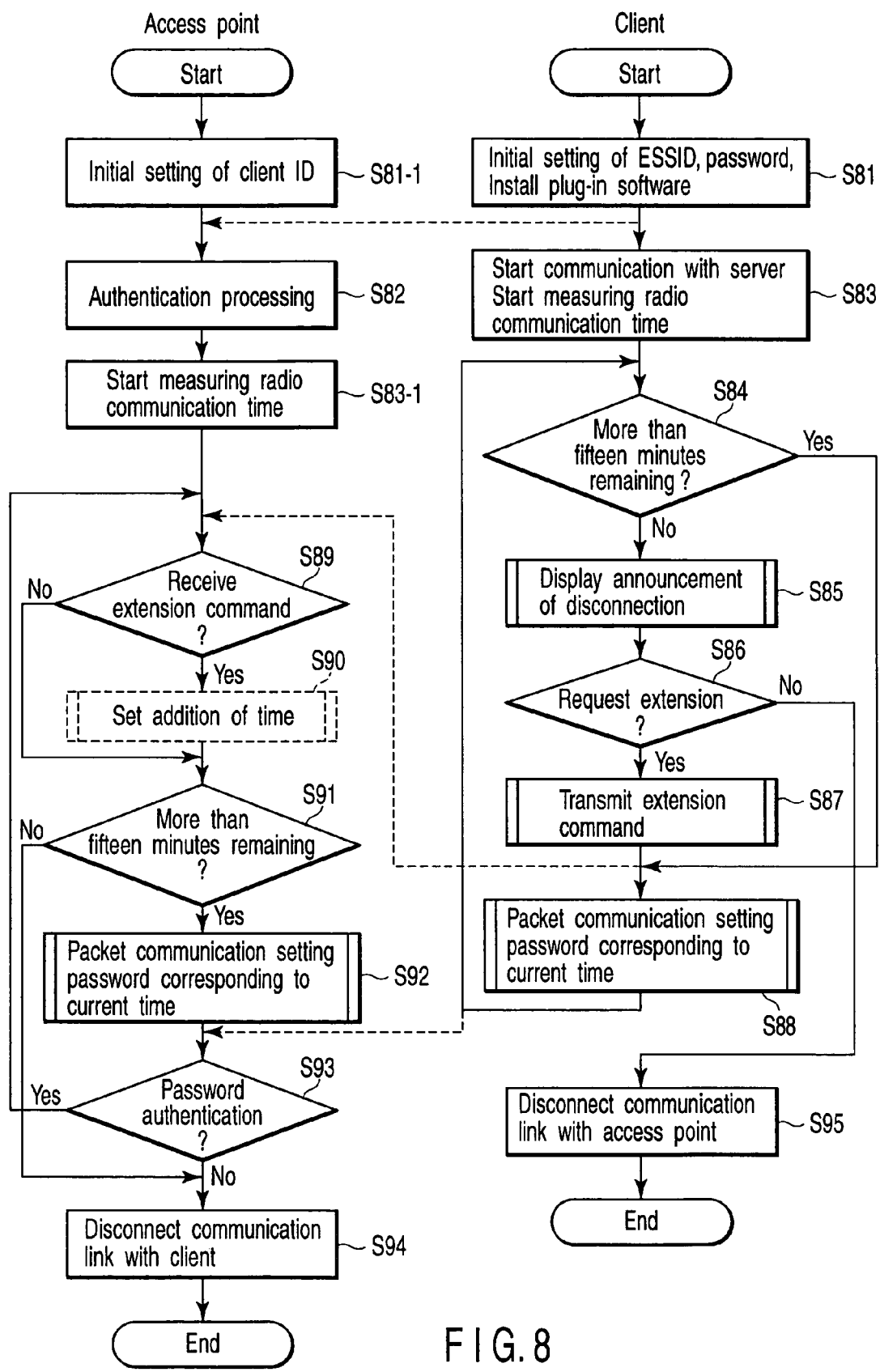
FIG. 8 shows a flowchart of operations of the wireless LAN system according to a third embodiment of the present invention.

The wireless LAN system of automatically updating the password in response to the time in the above procedure will be explained below as a third embodiment of the present invention. The wireless LAN system of this embodiment is apparently the same as that shown in FIG. 1. FIG. 8 shows a flowchart of operations of the wireless LAN system.

The flowchart indicates the processing of the access-point 1 and that of the client 2. The software for the processing executed by the access-point 1 is stored in a memory unit of the control unit 3.

Plug-in software P of the processing executed by the client 2 is small-scale software and is lent only to the client 2 of the service user by an administrator of the hot-spot service.

The plug-in software P includes passwords corresponding to a plurality of times shown in FIG. 7 as a password table. The plug-in software P is preinstalled in the client 2.

The plug-in software P is operated synchronously with the access-point 1 by referring to an internal clock of the client 2. The software interpolates the control of the wireless LAN with a WEB browser, an e-mail control program and the like installed in the client 2.

The plug-in software P executes the communication processing in the steps of WEP. When log-in is ended, the plug-in software P requests the user to reset the password in response to the time by referring to the internal clock, starts measuring the communication connection time, and allows the display unit of the client 2 to display the announcement of disconnection. In addition, if predetermined procedures of updating are executed within a determined period, the plug-in software P disconnects the communication.

For this reason, the plug-in software P has the following functions:
(1) WEP steps and setting the password in cooperation with the wireless LAN driver;
(2) allowing the announcement of disconnection of the communication to be displayed;
(3) measuring the radio communication time;
(4) disconnecting the communication link with the access-point 1; and
(5) storing the hot-spot service time.

The wireless LAN system according to the second embodiment will be explained below with reference to FIG. 8. In the following explanation, the service is offered for one hour. In accordance with this, the plug-in software P responding to the service time (one hour) is lent by the administrator of the hot-spot service, in return for the ID such as the MAC address and the like of the client 2.

The access-point 1 prestores an ESSID assigned to the client 2. The access-point 1 also stores the password table included in the plug-in software P. The control unit 3 executes initial setting of the password corresponding to the current time by referring to the password table (step s81-1).

The plug-in software P is installed in the client 2 (step s81). The client 2 starts up the plug-in software P. Using the plug-in software P, the client 2 sets the ESSID and executes the initial setting of the password corresponding to the current time by referring to the password table.

For example, it is assumed that the current time is nine forty-five in a case where the password table shown in FIG. 7 is included in the plug-in software P. "WORD1" is set as the password in the wireless LAN driver. At this time, the control unit 3 also sets "WORD1" as the password.

When the user operates the client 2 and inputs a command to start up the wireless LAN communication, the client 2 starts up the built-in wireless LAN driver software. The client 2 executes the operation by the software, controls the radio communication means provided in the client 2 in the steps of WEP, and attempts radio connection to the access-point 1.

The client 2 thereby transmits a radio signal and requests the access-point 1 to connect to the client 2. The radio signal is packetized and the ESSID is included in header information of the radio signal.

When the access-point 1 receives the radio signal, the control unit 3 executes the decryption processing of the encrypted packet data in predetermined steps of WEP (step s82). In the authentication processing, the control unit 3 attempts decryption of the packet data transmitted from the client 2 with the password set in step s81-1.

If the control unit 3 succeeds in decrypting the packet data, the control unit 3 recognizes the client 2 as an authorized user, reads the ESSID out of the header information of the packet data and stores the ESSID. The access-point 1 does not notify the client 2 of termination of the authentication or the like. If the control unit 3 fails the authentication processing, the user resets a correct password.

The control unit 3 permits the client 2 to log on to the wireless LAN system, establishes a communication link with the client 2, and starts measuring the radio communication time (step s83-1).

When the communication link is established in this procedure, the client 2 starts up the WEB browser software and executes communication with the server 7 connected to Internet 6 via the communication link and the access-point 1.

The client 2 can therefore download various kinds of data and application software from the server 7. The client 2 starts measuring the radio communication time by the plug-in software P (step s83).

The client 2 monitors a measurement result of the radio communication time started in step s83, with the plug-in software P. The client 2 discriminates, five minutes before the password is changed, whether the time remaining by subtracting the measurement result from the service time (one hour) is more than a predetermined time (for example, fifteen minutes) (step s84).

If the remaining time is more than the predetermined time, the client 2 shifts to step s88. If the remaining time is not, the client 2 shifts to step s85.

Figure 9:
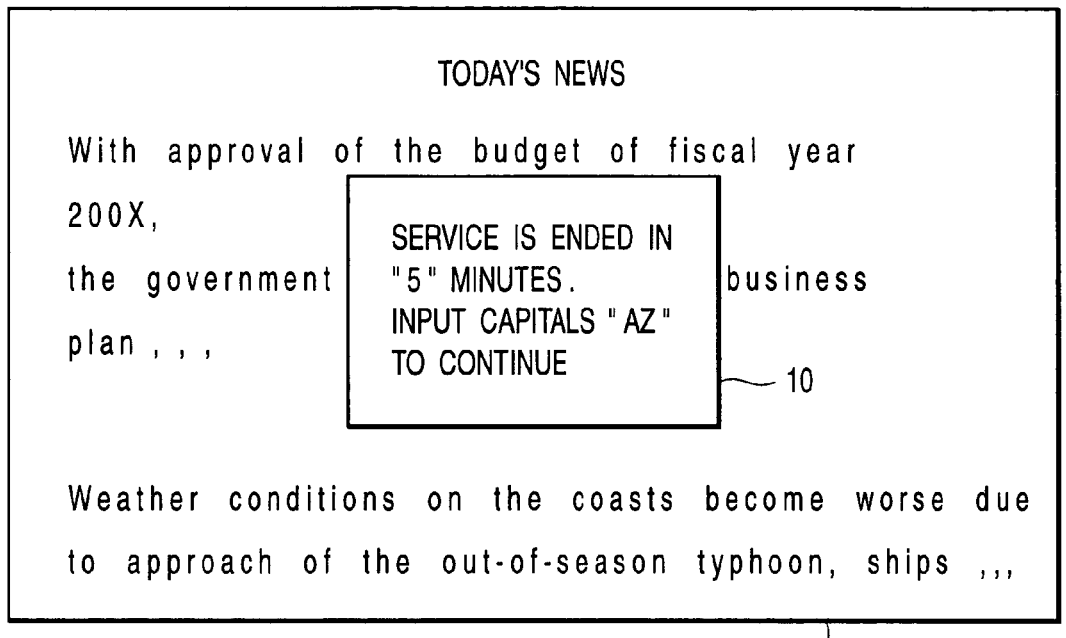
FIG. 9 shows an example of information displayed on a display unit of a client shown in FIG. 1.

In step s85, the client 2 allows an announcement display 10 to be shown on the display unit 2a of the client 2 as a pop-up display as shown in FIG. 9, by the plug-in software P, five minutes before the end of the service.

The announcement display 10 indicates that the radio communication link with the access-point 1 will be disconnected if an extension command to request extension of the service time is not input during the remaining time of five minutes. In FIG. 9, the extension command is shown as "AZ".

In step s86, the client 2 discriminates whether the extension command is input, by the plug-in software P. If the extension command is input, the client 2 shifts to step s87. If the extension command is not input, the client 2 shifts to step s95.

In step s87, the client 2 executes radio transmission of the extension command to the access-point 1, by the plug-in software P. The client 2 shifts to step s88.

In step s88, the client 2 sets the password corresponding to the current time by referring to the password table, with the plug-in software P. The client 2 shifts to step s83.

In step s88, the client 2 disconnects the communication link with the access-point 1, with the plug-in software P. In addition, the client 2 uninstalls the plug-in software P.

On the other hand, in step s89, the control unit 3 monitors whether the extension command is included in the receive signal from the client 2. If the extension command is included in the receive signal, the control unit 3 shifts to step s90 to extend the service time. If the extension command is not included in the receive signal, the control unit 3 shifts to step s91.

In step s91, the control unit 3 monitors a measurement result of the radio communication time started in step s83-1, and discriminates whether the time remaining by subtracting the measurement result from the service time is more than a predetermined time (for example, fifteen minutes). If the remaining time is more than the predetermined time, the control unit 3 shifts to step s92. If the remaining time is not, the control unit 3 shifts to step s94.

In step s92, the control unit 3 sets the password corresponding to the current time by referring to the password table. Then, the control unit 3 shifts to step s93.

In step s93, the control unit 3 executes the decryption processing of the encrypted packet data with the password set in step s92. If the control unit 3 succeeds the decryption, the control unit 3 shifts to step s89 and continues the communication.

If the control unit 3 fails the decryption, the control unit 3 shifts to step s94 and disconnects the communication link with the client 2.

In the wireless LAN system having the above-described configuration, the common password table is built in the access-point 1 and the client 2, and the communication is executed with the password changed in response to the current time.

For this reason, even if an unauthorized user temporarily executes radio connection with the access-point 1, the password is changed and the radio communication is disconnected after a certain time has passed. The unauthorized user's long-time use can be thereby prevented. In addition, since the user does not need to update the password in accordance with passage of the time, this wireless LAN system has much convenience.

In the third embodiment, the access-point 1 and the client 2 decrypt the received packet data with the current password and the new password from the time fives minutes before the password changing time. By setting this lead time in the access-point 1 and the client 2, the password can be changed smoothly.

Figure 10:
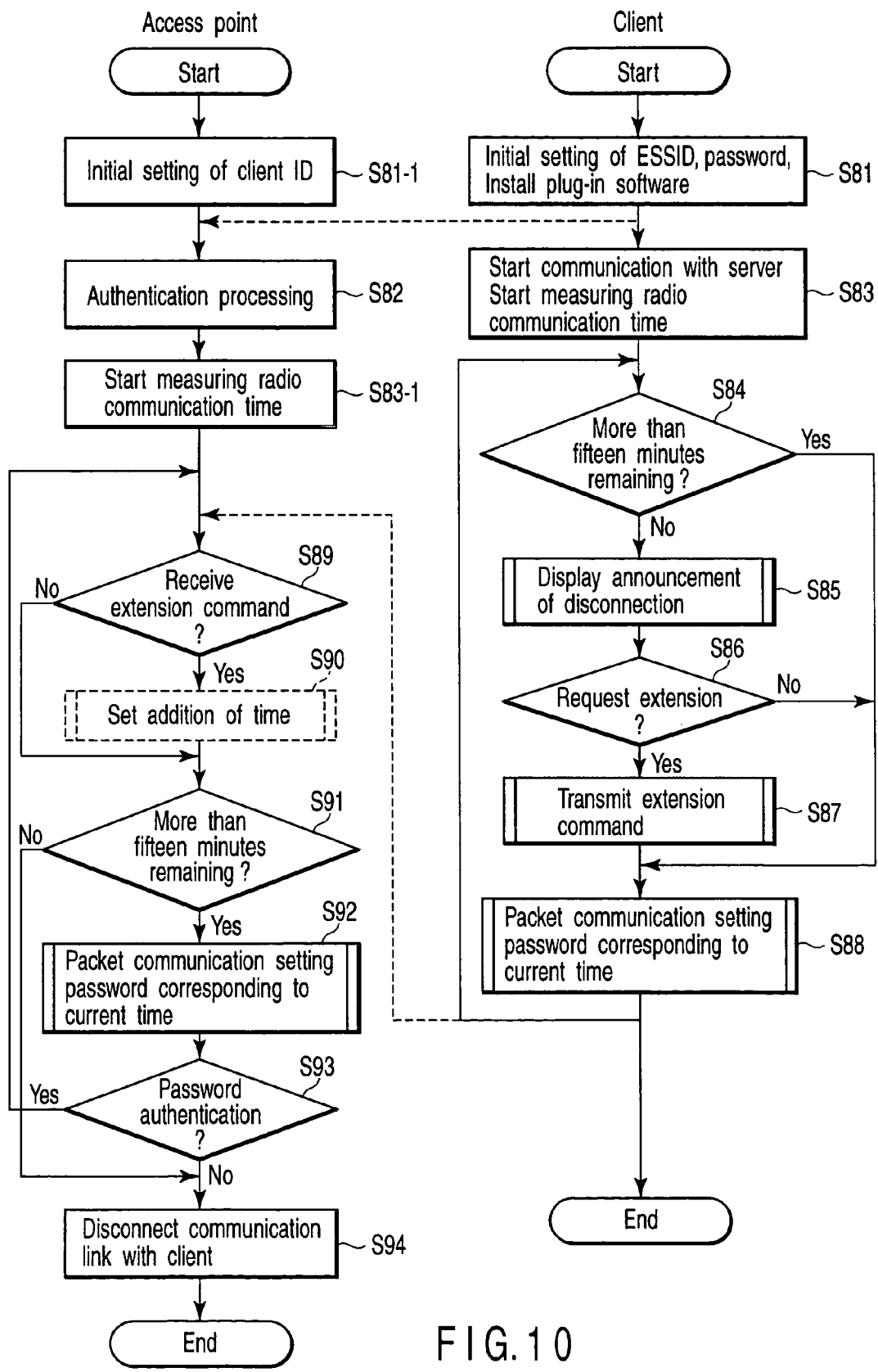
FIG. 10 shows a flowchart of operations of the wireless LAN system according to a fourth embodiment of the present invention.

Next, FIG. 10 shows a modified example of the flowchart shown in FIG. 8. A wireless LAN system of executing the processing of FIG. 10 will be explained below as a fourth embodiment of the present invention. In the following descriptions, different points to the wireless LAN system of the third embodiment will be particularly explained. The wireless LAN system of the fourth embodiment is apparently the same as that shown in FIG. 1.

In the wireless LAN system of the fourth embodiment, disconnection of the radio communication link is not executed by the client 2, but by the access-point 1. In other words, the client 2 of the fourth embodiment does not execute the processing of step s95 shown in FIG. 8.

If the user does not input the extension command, the client 2 in step s86 shifts to step s88. If the user inputs the extension command, the client 2 shifts to step s87.

In step s87, the client 2 executes the radio transmission of the extension command for the access-point 1, by the plug-in software P, and shifts to step s88. The client 2 encrypts the extension command with the new password and transmits the encrypted command.

For example, if the current time is ten fifty-five and the remaining service time is five minutes, the client 2 shifts to step s86 through steps s84 and s85. In step 86, if the user shows an intention to extend the time, the client 2 shifts to step s87.

In step s87, the client 2 detects "WORD7" in the password table as the new password, by referring to the fact that the current time is ten fifty-five. The client 2 encrypts the extension command with the new password "WORD7" and transmits the encrypted extension command.

In the access-point 1, the control unit 3 decrypts the extension command with the new password "WORD7" and the service time is extended.

If the user does not show an intention to extend the time in step s86, the access-point 1 shifts to step s88. When the time to set the new password comes, the new password is set, and the packet data is received and transmitted with the new password.

In this case, however, the access-point 1 does not receive the extension command. When the remaining time is shorter than five minutes, the access-point 1 shifts to step s94. When it is eleven o'clock, the access-point 1 disconnects the communication link.

The access-point 1 may disconnect the connection with the client 2 that does not request extension of the service time, in the other procedure. For example, step s92 of FIG. 8 may be omitted and the client 2 may set the new password as it is and transmit the packet.

According to this procedure, if the client 2 requests extension of the service time, the client 2 transmits the command "AZ" with the current password ("WORD6" if it is ten fifty-five) in step s87, similarly to FIG. 8.

If the client 2 does not request extension of the service time, the access-point 1 shifts from step s91 to step s94 since the access-point 1 does not receive the extension command. When it is eleven o'clock, the access-point 1 disconnects the communication link with the client 2.

Next, a wireless LAN system according to a fifth embodiment of the present invention will be explained below. In the wireless LAN system of this embodiment, the packet data of the format shown in FIG. 11 is transmitted and received between the access-point 1 and the client 2.

Figures 11, 12:
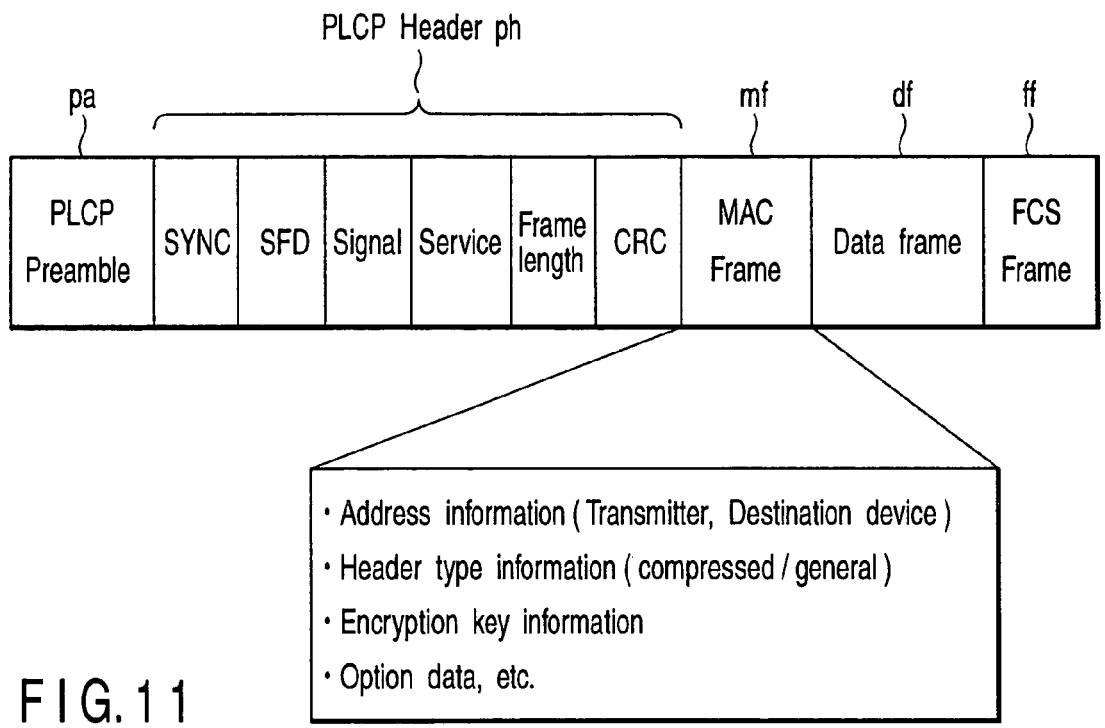
FIG. 11 shows a format of packet data transmitted and received between the access-point and the client shown in FIG. 1.
FIG. 12 shows a password table stored by an access-point and the client shown in FIG. 1.

In FIG. 11, pa, ph, mf, df, and ff represent PLCP preamble, PLCP header, MAC frame, data frame, FCS frame, respectively.

In the WEP, the password is set in the MAC frame mf. The authentication procedure of the wireless LAN system is executed by the wireless LAN driver. The plug-in software P executed by the client 2, according to this embodiment, is constructed to input the password even when the software accesses Web with the WEP password by the WEB browser.

In addition, in this embodiment, the ESSID and password of the WEP are set at the initial stage of using the hot-spot service. After that, the communication is executed without changing the ESSID and password. The password used by the plug-in software P is changed instead of the authentication using the WEP, to control disconnection of the communication link.

For this reason, for example, a password setting area of five Alphabetical and numerical characters is set at the head of the data frame df shown in FIG. 11. A portion following the password setting area is encrypted by scrambling using the password as a key.

In the following explanation, this password is called password S to distinguish it from the WEP password. The password S is changed on the basis of the password table corresponding to the time.

The password table is stored in each of the control unit 3 of the access-point 1 and the plug-in software P of the client 2. An example of the password table is shown in FIG. 12.

Figure 13:
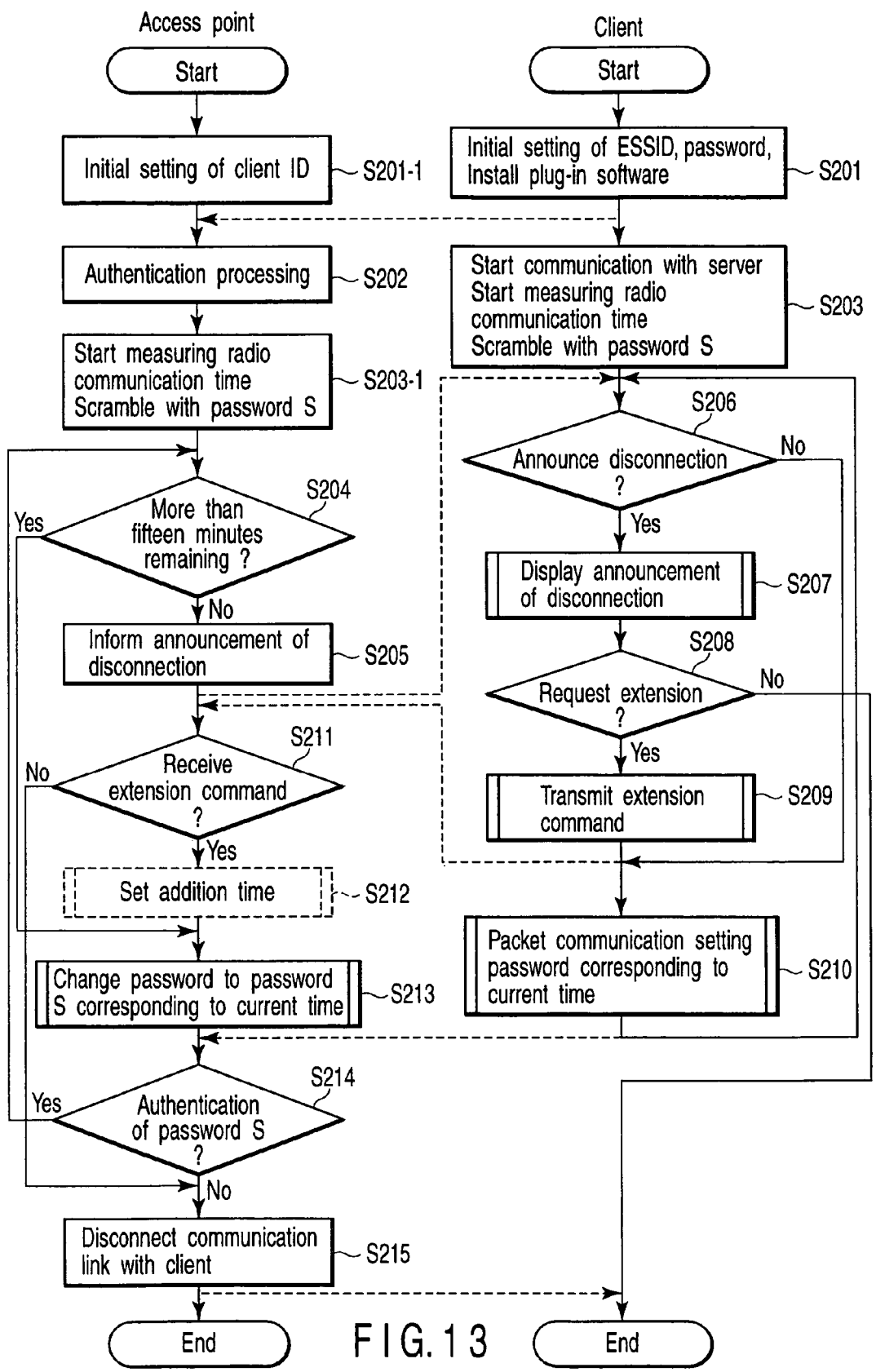
FIG. 13 shows a flowchart of operations of the wireless LAN system according to a fifth embodiment of the present invention.

The wireless LAN system is apparently the same as that shown in FIG. 1. FIG. 13 shows a flowchart of operations of the wireless LAN system. The operations of the wireless LAN system according to the fifth embodiment will be explained with reference to FIG. 13.

The flowchart indicates the processing of the access-point 1 and that of the client 2. The software for the processing executed by the access-point 1 is stored in a memory unit of the control unit 3.

The plug-in software P of the processing executed by the client 2 is small-scale software and is lent only to the client 2 of the service user by an administrator of the hot-spot service.

The plug-in software P is operated synchronously with the access-point 1 by referring to an internal clock of the client 2. The software interpolates the control of the wireless LAN with a WEB browser, an e-mail control program and the like installed in the client 2.

The access-point 1 prestores the ESSID assigned to the client 2. In addition, access-point 1 stores the password table included in the plug-in software P. The control unit 3 refers to the password table to execute the initial setting of the password corresponding to the current time (step s201-1).

The plug-in software P is installed in the client 2 (step s201). The client 2 starts up the plug-in software P. Using the plug-in software P, the client 2 sets the ESSID and executes the initial setting of password S corresponding to the current time by referring to the password table.

For example, it is assumed that the current time is nine forty-five in a case where the password table shown in FIG. 12 is included in the plug-in software P. "LANPA" is set as the password S in the wireless LAN driver. At this time, the control unit 3 also sets "LANPA" as the password S.

When the user operates the client 2 and inputs a command to start up the wireless LAN communication, the client 2 starts up the built-in wireless LAN driver software. The client 2 executes the operation by the software, controls the radio communication means provided in the client 2 in the steps of WEP, and attempts radio connection to the access-point 1.

The client 2 thereby transmits a radio signal and requests the access-point 1 to connect to the client 2. The radio signal is packetized and the ESSID is included in header information of the radio signal.

When the access-point 1 receives the radio signal, the control unit 3 executes the decryption processing of the encrypted packet data in predetermined steps of WEP (step s202). In the decryption processing, the control unit 3 attempts decryption of the packet data transmitted from the client 2 with the password S set in step s201-1.

If the control unit 3 succeeds in decrypting the packet data, the control unit 3 recognizes the client 2 as an authorized user, reads the ESSID out of the header information of the packet data and stores the ESSID. The access-point 1 does not notify the client 2 of termination of the authentication or the like. If the control unit 3 fails the authentication processing, the user resets a correct password S.

The control unit 3 permits the client 2 to log on to the wireless LAN system, establishes a communication link with the client 2, and starts measuring the radio communication time (step s203-1).

The control unit 3 decrypts the data frame df, of the received packet data, with the password S. The control unit 3 sets "LANPA" as the password S at the head of the data frame df of the packet data to be transmitted, scrambles the following data of the data frame df with the password S, and transmits the packet data.

When the communication link is established in this procedure, the client 2 starts up the WEB browser software and executes communication with the server 7 connected to Internet 6 via the communication link and the access-point 1.

The client 2 can therefore download various kinds of data and application software from the server 7. The client 2 starts measuring the radio communication time by the plug-in software P (step s203).

The client 2 decrypts the data frame df, of the received packet data, with the password S. The client 2 sets "LANPA" as the password S at the head of the data frame df of the packet data to be transmitted, scrambles the following data of the data frame df with the password S, and transmits the packet data.

In the access-point 1, the control unit 3 monitors a measurement result of the radio communication time started in step s203-1. The control unit 3 discriminates, five minutes before the password S is changed, whether the time remaining by subtracting the measurement result from the service time (one hour) is more than a predetermined time (for example, fifteen minutes) (step s204).

If the remaining time is more than the predetermined time, the control unit 3 shifts to step s213. If the remaining time is not, the control unit 3 shifts to step s205.

In step s205, the control unit 3 transmits the display data to allow an announcement display 10 to be shown on the display unit 2a of the client 2 as a pop-up display as shown in FIG. 9, five minutes before the end of the service.

The announcement display 10 indicates that the radio communication link with the access-point 1 will be disconnected if an extension command to request extension of the service time is not input during the remaining time of five minutes. In FIG. 9, the extension command is shown as "AZ".

In step s206, the client 2 discriminates whether the display data is received, by the plug-in software P. If the display data is received, the client 2 shifts to step s207. If the display data is not received, the client 2 shifts to step s210.

In step s207, the client 2 allows the announcement display 10 to be shown on the display unit 2a of the client 2 as a pop-up display as shown in FIG. 9, by the plug-in software P. The client 2 shifts to step s208.

In step s208, the client 2 discriminates whether the extension command is input with the plug-in software P. If the extension command is input, the client 2 shifts to step s209.

In step s209, the client 2 executes radio transmission of the extension command for the access-point 1, with the plug-in software P and shifts to step s210.

In step s210, the client 2 sets the password corresponding to the current time by referring to the password table, with the plug-in software P and shifts to step s206.

For example, if the current time is nine fifty-five, the client 2 changes the password S "LANPW" to "LANP2" and sets the new password, by referring to the password table.

In step s211, the control unit 3 monitors whether the extension command is included in the signal received from the client 2. If the extension command is included in the received signal, the control unit 3 shifts to step s212 and extends the service time. If the extension command is not included in the received signal, the control unit 3 shifts to step s215.

In step s213, the control unit 3 sets the password corresponding to the current time by referring to the password table, and shifts to step s214.

In step s214, the control unit 3 executes the decryption processing of the encrypted packet data by using the password set in step s213, for client 2. If the control unit 3 succeeds the decryption, the control unit 3 shifts to step s204, continues the communication and waits for a timing of changing a next password S.

If the control unit 3 fails the decryption, the control unit 3 discriminates an unauthorized access, shifts to step s215 and disconnects the communication link with the client 2.

In the access-point 1, the control unit 3 also executes the above-explained processing for the other clients. The client is identified with its ID (identification information) such as the MAC address and the like.

In the wireless LAN system having the above-described configuration, the common password table is built in the access-point 1 and the client 2, and the communication is executed while the password S which is to be a scramble key is changed in response to the current time.

For this reason, even if an unauthorized user temporarily executes radio connection with the access-point 1, the password is changed and the radio communication is disconnected after a certain time has passed. The unauthorized user's long-time use can be thereby prevented. In addition, since the user does not need to update the password in accordance with passage of the time, this wireless LAN system has much convenience.

In the fifth embodiment, the access-point 1 and the client 2 decrypt the received packet data with the current password and the new password from the time fives minutes before the password changing time. By setting this lead time in the access-point 1 and the client 2, the password can be changed smoothly.

In the above-explained embodiments, the wireless LAN system using the WEP steps is explained. However, the present invention is not limited to the steps, but the same advantage can be obtained by applying the present invention to a wireless LAN system using the other steps or the other radio communication system.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication system providing a hot-spot capable of executing radio communication by using a wireless LAN with a radio terminal, and allowing the radio terminal to be connected to a network, the system comprising:
   radio communication means for executing wireless LAN communication with the radio terminal;
   connection time measuring means for measuring a radio communication time with the radio terminal using the radio communication means;
   termination announcing means comprising announcement display means for visually announcing the termination of the radio connection to a user of the radio terminal and notifying the user of a password if the radio communication time exceeds a first preset time, the termination announcing means being installed in the hot-spot; and
   communication control means for, after the termination announcing means executes the notifying, controlling the radio communication means to terminate the radio connection with the radio terminal if the radio communication means does not receive a response signal using the password from the radio terminal, or if the radio communication time measured by the connection time measuring means exceeds a second preset time.

2. The radio communication system according to claim 1, further comprising:
   remaining time measuring means for measuring a time remaining until the radio connection is terminated by the communication control means,
   wherein the termination announcing means visually notifies the user of the radio terminal of the remaining time measured by the remaining time measuring means.

3. The radio communication system according to claim 1, wherein the termination announcing means controls the radio communication means to announce visually the termination of the radio connection to the user of the radio terminal through the radio terminal.

* * * * *